United States Patent [19]

Shimada et al.

[11] Patent Number: 4,507,467

[45] Date of Patent: Mar. 26, 1985

[54] WHOLLY AROMATIC HALOGENATED POLYAMIDE FIBER AND FILM

[75] Inventors: Keizo Shimada; Hideharu Sasaki; Hiroshi Mera; Toru Sawaki; Akihiro Aoki, all of Iwakuni, Japan

[73] Assignee: Teijin Limited, Osaka, Japan

[21] Appl. No.: 527,377

[22] Filed: Aug. 29, 1983

Related U.S. Application Data

[63] Continuation of Ser. No. 290,166, Aug. 5, 1981, abandoned.

[30] Foreign Application Priority Data

Aug. 7, 1980 [JP]  Japan ............................... 55-107749

[51] Int. Cl.[3] ............................................ C08G 69/32
[52] U.S. Cl. .................................... 528/348; 528/183; 528/229; 528/321; 528/331; 528/337; 528/340; 528/329.1
[58] Field of Search ............... 528/348, 183, 229, 321, 528/337, 340, 331, 329

[56] References Cited

U.S. PATENT DOCUMENTS 4,075,172  2/1978  Ozawa et al. ...................... 528/348
4,355,151  10/1982  Shimada et al. .................... 528/348

Primary Examiner—Harold D. Anderson
Attorney, Agent, or Firm—Burgess, Ryan & Wayne

[57] ABSTRACT

High modulus shaped articles such as fibers and films, composed of a wholly aromatic copolyamide, are provided. The wholly aromatic copolyamide is comprised of recurring units of the formulae:

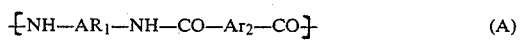

and

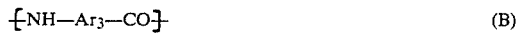

wherein $Ar_1$, $Ar_2$ and $Ar_3$ independently stand for divalent groups selected from

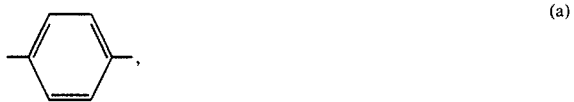

(a)

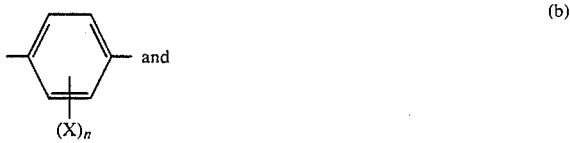

(b)

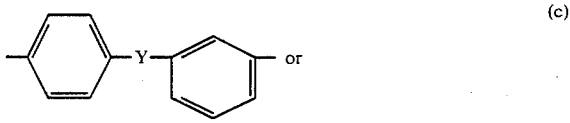

(c)

in which X's independently stand for a group selected from halogeno, alkyl, aralkyl, aromatic, alkoxy, acetyl and cyano, n is 1 to 3 and Y is selected from

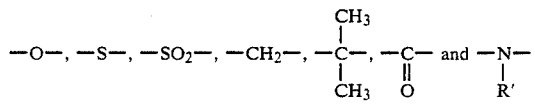

in which R' stands for an 1–5C alkyl group, and the copolymerization ratio expressed by the molar ratio of the total of $Ar_1$, $Ar_2$ and $Ar_3$ fails within the square hatched region in a triangular coordinate of FIG. 1, and said copolyamide has an intrinsic viscosity of at least 1.5. The shaped articles are prepared by a process wherein a solution comprised of the above-defined wholly aromatic copolyamide, a halide of a metal of Group I or II of the Periodic Table and an amide type organic solvent is subjected to wet or dry shaping; and then, the shaped article is stretched at a stretch ratio of at least 1.5 at an elevated temperature.

6 Claims, 1 Drawing Figure

WHOLLY AROMATIC HALOGENATED POLYAMIDE FIBER AND FILM

The application is a continuation of application Ser. No. 290,166, filed Aug. 5, 1981, now abandoned.

BACKGROUND OF THE INVENTION a. Field of the Invention

The invention relates to high-tenacity wholly aromatic polyamide fiber and film having a very high modulus and a process for the preparation thereof.

b. Description of the Prior Art

It is known that wholly aromatic polyamides have a high melting point and a high glass transition point and they are excellent in physical and chemical properties such as heat resistance, flame resistance, flame retardancy and chemical resistance. Accordingly, they are very valuable as various shaped articles such as fibers and films. It also is known that among wholly aromatic polyamides, a para-oriented polymer, for example, poly(p-phenylene terephthalamide), gives a fiber or film having especially high tenacity and a high modulus. Such high-tenacity and high-modulus shaped articles have widely been used as industrial materials.

In the field of industrial materials, wholly aromatic polyamide shaped articles having further improved characteristics have been desired under the stimulus of the above-mentioned high-tenacity and high-modulus fibers. More specifically, high-tenacity wholly aromatic polyamide fibers are now desired mainly as fibers for reinforcing light communication cables or ropes to be used for special purposes.

In high-tenacity high-modulus wholly aromatic polyamides which have been marketed and are now being developed, the modulus is about 300 to about 550 g/d. It is said that the modulus that should be possessed by high-capacity wholly aromatic polyamide fibers which are eagerly desired at present is at least 650 g/d, preferably at least 700 g/d.

As a fiber having such a very high modulus, there can be mentioned Kevlar-49 manufactured and supplied by Du Pont Co. This Kevlar-49 is prepared through the following spinning and heat treatment steps.

1. Spinning

A high-concentration liquid crystal dope comprising poly-(p-phenylene terephthalamide) and sulfuric acid is subjected to dry-jet wet spinning using water or dilute sulfuric acid as a coagulating bath (see Japanese Patent Publication No. 14,170/80).

2. Heat Treatment

The as-spun filaments formed by the above dry-jet wet spinning is heat-treated under tension at 250° to 600° C. (see Japanese Patent Publication No. 14,167/80).

In this process, however, sulfuric acid which is very dangerous and highly corrosive is used as a solvent and special steps of isolating, washing and drying the polymer and dissolving the dried polymer into concentrated sulfuric acid are inevitably adopted.

Preparation of a spinning dope by forming a polymer solution by low temperature solution polymerization of an aromatic diamine and an aromatic diacid chloride in an amide type polar solvent and neutralizing hydrogen chloride formed as a by-product with, for example, Ca(OH)$_2$, has already been practiced for production of meta-oriented polyamide shaped articles (see Japanese Patent Publication No. 16,027/60). Furthermore, a process in which the above method is applied to the preparation of para-oriented polyamides obtained from a combination of specific monomers and the resulting spinning dope is subjected to wet spinning and hot drawing to obtain high modulus fibers having a modulus of at least 300 g/d has already been proposed (see Japanese Patent Application Laid-Open Specification No. 136,916/76).

SUMMARY OF THE INVENTION

It is a primary object of the present invention to provide wholly aromatic polyamide fibers and films which have the desired high modulus and which can be produced advantageously by spinning a solution of a wholly aromatic polyamide in an organic solvent.

Other objects and advantages of the present invention will be apparent from the following description.

In one aspect of the present invention, there is provided a shaped article composed of a wholly aromatic copolyamide consisting essentially of recurring units represented by at least one of the following general formulae:

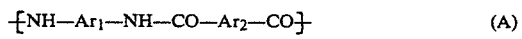

(A)

and

(B)

wherein Ar$_1$, Ar$_2$ and Ar$_3$, which may be the same or different, stand for divalent aromatic hydrocarbon ring residues selected from the group consisting of

(a)

(b)

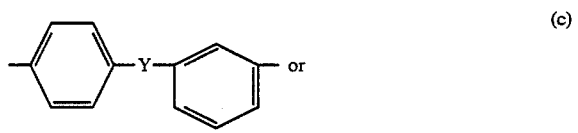

(c)

in which X's, which may be the same or different, stand for a group selected from a halogeno group, an alkyl group, an aralkyl group, an aromatic group, an alkoxy group, an acetyl group and a cyano group, n is an integer of from 1 to 3, and Y is a group selected from

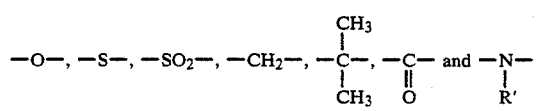

in which R' stands for an alkyl group having up to 5 carbon atoms,
and the copolymerization ratio expressed by the molar ratio of the total aromatic residues of $Ar_1$, $Ar_2$ and $Ar_3$ falls within a region (the hatched region) formed by connecting points P, Q, R and S in order through straight lines illustrated in a triangular coordinate of FIG. 1, said wholly aromatic copolyamide having an intrinsic viscosity of at least 1.5.

The shaped article may be in the form of a fiber having a tensile modulus of at least 650 g/d, preferably at least 700 g/d and more preferably at least 750 g/d as measured at room temperature and preferably having a tensile strength of at least 18 g/d as measured at room temperature. The shaped article may also be in the form of a film having a tensile modulus of at least 1,800 $kg/mm^2$ as measured at room temperature.

In another aspect of the present invention, there is provided a process for preparing a shaped article such as a fiber or a film composed of the above-defined wholly aromatic polyamide, which comprises the steps of:

subjecting a polymer solution comprising the above-defined wholly aromatic copolyamide, a halide of a metal of Group I or Group II of the Periodic Table and an amide type organic solvent to wet shaping or dry shaping; and then, stretching the resulting shaped article at an elevated temperature at a stretch ratio of at least 1.5. The stretching is preferably carried out at a temperature of 300° to 700° C. in the case where the shaped article is fiber, and at a temperature of 95° to 700° C. in the case where the shaped article is a film.

DESCRIPTION OF THE PREFERRED EMBODIMENTS

Figure 1:
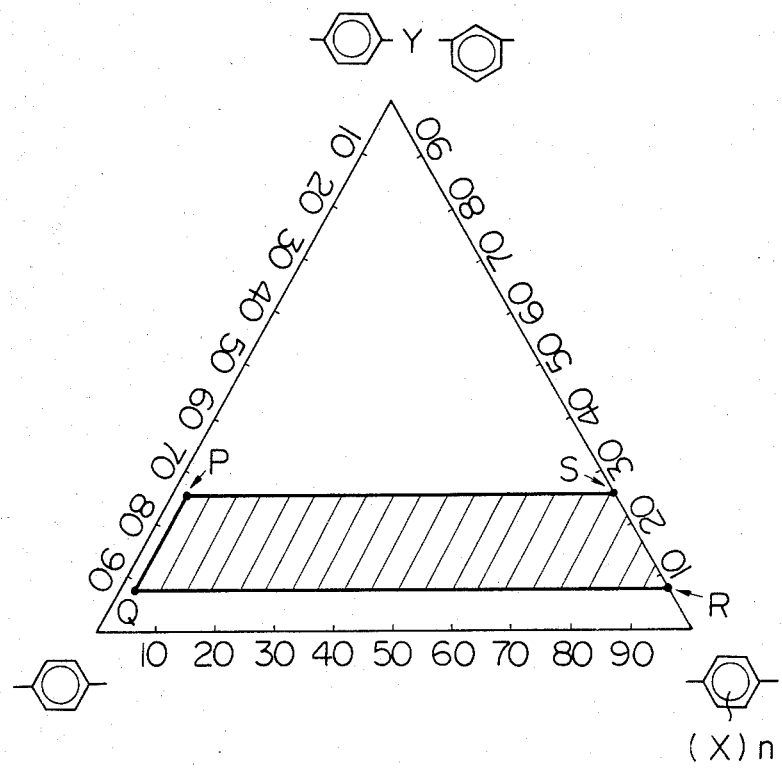

The wholly aromatic polyamide of the present invention consists essentially of recurring units represented by the following general formula:

$$-\text{[NH}-Ar_1-\text{NH}-\text{CO}-Ar_2-\text{CO]}- \quad (A)$$

and/or $$-\text{[NH}-Ar_3-\text{CO]}- \quad (B)$$

In these general formulae (A) and (B), $Ar_1$, $Ar_2$ and $Ar_3$, which may be the same or different, are selected from the above-mentioned group (a) and/or the above-mentioned group (b) and/or the above-mentioned group (c). The composition of the total of the groups $Ar_1$, $Ar_2$ and/or $Ar_3$ must fall within the hatched region indicated in FIG. 1.

The copolymer having the above-mentioned structure specified in the present invention can be prepared from various combinations of monomers, that is, at least one aromatic diamine and at least one aromatic diacid chloride. As the aromatic diacid chloride, there are preferably used terephthaloyl dichloride, monochloroterephthaloyl dichloride and dichloroterephthaloyl dichloride. Of these, terephthaloyl dichloride is especially preferred.

As the aromatic diamine preferably combined with the above-mentioned aromatic diacid chloride, there can be mentioned an aromatic diamine mixture comprising 3,4'-diaminodiphenyl ether and o-chloro-p-phenylene diamine and an aromatic diamine mixture comprising 3,4'-diaminodiphenyl ether, o-chloro-p-phenylene diamine and p-phenylene diamine.

The wholly aromatic polyamide constituting the shaped article of the present invention should have a copolymerization ratio defined by the region formed by connecting points P, Q, R and S in a triangular coordinate of FIG. 1 in order through straight lines, that is, the hatched region in FIG. 1. Only if this requirement of the copolymerization ratio is satisfied, the intended fiber and film having high tenacity and Young's modulus and other desired characteristics can be obtained.

When the copolymerization ratio is outside the hatched region shown in FIG. 1, the obtained fiber is poor in the physical properties, and the spinnability and drawability are degraded. Moreover, the stability of the starting spinning solution is bad and a fiber is not obtained from this spinning solution smoothly in good condition. Furthermore, the stability of the starting dope for formation of a film is also degraded, and the resulting film is poor in its physical properties.

The points P, Q, R and S referred to in the present specification represent the following points.

| | P | Q | R | S |
|---|---|---|---|---|
| 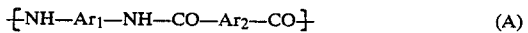 | 25 | 7.5 | 7.5 | 25 |
|  | 72.5 | 90 | 0 | 0 |
| (graphic with $(X)_n$) | 2.5 | 2.5 | 92.5 | 75 |

(unit: mole %)

The points P', Q', R' and S' defining a preferred copolymerization ratio are as follows.

| | P' | Q' | R' | S' |
|---|---|---|---|---|
| (graphic with Y) | 22.5 | 7.5 | 7.5 | 22.5 |
| (graphic) | 70 | 85 | 0 | 0 |
| (graphic with $(X)_n$) | 7.5 | 7.5 | 92.5 | 77.5 |

(unit: mole %)

In the wholly aromatic polyamide used in the present invention, the kind, number and proportion of each of $Ar_1$, $Ar_2$ and $Ar_3$ may optionally be changed within the above-mentioned range of the composition, whereby the intended fiber or film can be obtained.

Another important condition of the present invention is that the intrinsic viscosity of the wholly aromatic polyamide, which is a measure of the average molecular weight of the obtained polymer, should be at least 1.5 and preferably at least 2.5. The intrinsic viscosity ($\eta$inh) referred to in the present specification is a value determined by isolating a polymer from a polymerization reaction mixture or starting a spinning dope and conducting measurement on a solution containing 0.5 g of the polymer in 100 ml of concentrated sulfuric acid at 30° C.

The wholly aromatic polyamide of the present invention may comprise up to 5 mole % of recurring units other than those represented by the above formulae (A) and (B) (for example, m-phenylene, ethylene, trimethylene, tetramethylene, hexamethylene and N,N-aliphatic chains) and/or linkages (such as ester linkages) other than amide linkages. Of course, minor amounts of additives such as a pigment, a delustering agent, a stabilizer and an ultraviolet absorber may be incorporated into the aromatic polyamide of the present invention.

The wholly aromatic polyamide of the present invention having recurring units represented by the above general formula (A) and/or (B) can be prepared by any known processes, for example, the melt polymerization process, the solid phase polymerization process, the interfacial polymerization process, the solution polymerization process and combinations thereof. Among these processes, the interfacial polycondensation process (see Japanese Patent Publication No. 13,247/72), the oligomer polymerization process (Japanese Patent Publication No. 10,863/72) and the low temperature solution polymerization process (Japanese Patent Publication No. 14,399/60) are preferred, and when it is desired to obtain a polymer having a high molecular weight, the low temperature solution polymerization process is especially preferred.

The copolymer solution to be used for shaping in the present invention can be prepared according to any of the following two methods.

(1) A wholly aromatic polyamide prepared according to the above-mentioned process is mixed with an amide type organic polar solvent and a halide of a metal of the Group I and/or Group II of the Periodic Table and/or a hydrogen halide as a solubilizing agent at an appropriate ratio to form a shaping dope.

(2) An aromatic diamine and an aromatic diacid chloride are polycondensed in an organic polar solvent and HCl in the obtained polymer solution is neutralized with Ca(OH)$_2$ or the like, whereby a shaping dope is obtained without isolation of the polymer.

As the organic polar solvent used in the present invention, there can be mentioned hexamethylphosphoramide (HMPA), N-methylpyrrolidone (NMP), N,N-dimethylacetamide (DMA), dimethylsulfoxide (DMSO), N-methyl caprolatam, N-methylpiperidine, N,N-dimethylformamide (DMF), N,N,N',N'-tetramethylurea (TMU) and mixtures thereof. Among these solvents, NMP, DMA, DMSO and mixtures thereof are preferably used.

In order to improve the stability at high temperatures, it is preferred that a small amount of a halide of a metal of the Group I or Group II of the Periodic Table be added to a spinning solution formed by dissolving the aromatic polyamide in an organic polar solvent such as mentioned above so as to improve the solubility. Lithium chloride, calcium chloride and magnesium bromide are preferably used. These metal halides may be used either alone or in combination. When it is desired to reduce the viscosity of the solution to an appropriate level, a hydrogen halide, preferably hydrogen chloride, may be incorporated into the solution.

In the case where a spinning dope is prepared by a re-dissolving process, it is preferred that the wholly aromatic polyamide be sufficiently finely divided prior to the re-dissolving operation. It also is preferred that a wholly aromatic polyamide having a low degree of crystallization be used. Mixing of the wholly aromatic polyamide with the above-mentioned organic polar solvent is preferably accomplished by sufficiently admixing them with each other at an appropriate temperature prior to dissolution, as disclosed in Japanese Patent Publication No. 4,461/73. After this homogeneous admixing, the mixture is heated at an appropriate temperature to promote dissolution. This appropriate heating temperature varies depending upon the chemical composition of the aromatic polyamide, the kind of the solvent, the mixing ratio and the content of the above-mentioned metal halide and/or hydrogen halide, but this heating temperature is ordinarily in the range of from 0° to 150° C.

The content of the wholly aromatic polyamide in the spinning dope is preferably in the range of from 2 to 20% by weight and especially preferably in the range of from 4 to 15% by weight, though such preferred range varies to some extent depending upon the content of the above-mentioned metal halide and/or hydrogen halide. It is preferred that the content of the halide of a metal of the Group I and/or Group II of the Periodic Table be in the range of from 0.2% to 10% by weight based on the total weight of the solution. Ordinarily, the higher the content of the metal halide, the more improved are the solubility, the dissolution speed and the solution stability and the more increased is the viscosity of the solution. For example, if the content of the metal halide exceeds 10% by weight, the coagulating property at the spinning step tends to be degraded.

The known wet shaping method or dry shaping method may be adopted as the shaping method.

In the wet shaping method, a water bath or aqueous solution of an organic polar solvent, maintained at 0° to 100° C., may be used as a bath for coagulating the above-mentioned wholly aromatic polyamide dope. Furthermore, a lower alcohol bath, an ethylene glycol bath and an aqueous bath thereof, a salt water bath or a halogenated hydrocarbon bath may be used as the coagulating bath.

The temperature of the coagulating bath may be in the range of from 0° C. to the boiling point (under atmospheric pressure) of the coagulating bath. It is preferred that the concentration of the organic polar solvent in the bath be not more than 50% by weight, especially not more than 30% by weight, based on the total weight of the bath. According to the composition of the wholly aromatic polyamide or the kind or content of the metal halide and/or hydrogen halide when such is contained in the spinning dope, it sometimes happens that reverse diffusion of the coagulating bath into the extruded filament becomes excessive to render the texture of the extruded filament brittle and the subsequent heat treatment cannot be performed smoothly. In this case, it is preferred that a coagulating bath comprising, in addition to the solvent and water, at least one inorganic salt selected from the group consisting of lithium chloride, sodium chloride, calcium chloride, magnesium chloride, zinc chloride, strontium chloride, aluminum chloride, stannic chloride, nickel chloride, calcium bromide, calcium nitrate, zinc nitrate and aluminum nitrate be used.

Although a preferred content of such inorganic salt varies to some extent depending upon the composition of the spinning solution, prominent effects can ordinarily be attained when the inorganic salt is incorporated in a total amount (as calculated as the anhydrous salt) of at least 2 moles in 1 liter of water.

The foregoing inorganic salts may be used alone or in combination. Among the foregoing inorganic salts, chlorides such as magnesium chloride, calcium chloride, zinc chloride and aluminum chloride are especially preferred.

Wet shaping can be accomplished by extruding the shaping dope into the above-mentioned coagulating bath through nozzle holes, slits, orifices or dies. There may be adopted a so-called dry-jet wet shaping method in which the shaping dope is once extruded into a gaseous medium through the above-mentioned extrusion holes or orifices and is then introduced into the coagulating bath.

In the present invention, a conventional spinning apparatus can be used for the production of wholly aromatic polyamide fibers, and conventional spinning methods such as the horizontal or vertical wet spinning method, the semi-dry semi-wet spinning method and the flow tension spinning method are preferably adopted. A flow pipe or the like may be used if necessary.

In the present invention, there may preferably be adopted a method in which an aqueous coagulating bath containing or not containing the above-mentioned inorganic salt is used as a first bath and a water bath is used as a second bath for promoting removal of the coagulating agent and coagulation and for washing away the salt from the shaped article when the salt contained in the first bath is left on the shaped article.

Dry shaping is accomplished by extruding the above-mentioned wholly aromatic polyamide dope into a heated atmosphere through a nozzle hole or slit die.

The shaped article obtained by wet shaping or dry shaping is washed with water or hot water and/or an organic solvent to remove the shaping solvent, additives, reaction products, solubilizing agent and the like. Thereafter, the washed shaped article is subjected to stretching.

The stretching temperature may appropriately be chosen after due consideration of the molecular structure of the wholly aromatic polyamide and the intended properties of the resulting shaped article. Usually, the stretching temperature may be chosen in the range of from 300° to 700° C. in the case of a fiber and in the range of 95° to 700° C. in the case of a film. Stretching may be performed according to the one-stage or multi-stage method, and the overall stretch ratio is at least 1.5 and ordinarily in the range of from 1.5 to 15. When the stretched shaped article is treated in an atmosphere maintained at a temperature higher than 250° C. or in a solvent (or a solvent-water mixture) maintained at an appropriate temperature for several seconds to scores of minutes in the relaxed state or under slight tension, the physical properties can be improved.

The obtained shaped article of the present invention has the following physical properties.

Fiber:

The tensile modulus is at least 650 g/d, preferably at least 700 g/d and more preferably at least 750 g/d, as measured at room temperature. The tensile modulus can be raised up to approximately 2,000 g/d. Furthermore, the tensile strength is at least 18 g/d and preferably at least 20 g/d, as measured at room temperature. The tensile strength can be raised up to approximately 50 g/d.

Film:

The tensile modulus is at least 1,800 $Kg/mm^2$, preferably at least 2,000 $Kg/mm^2$ and more preferably at least 2,200 $Kg/mm^2$, as measured at room temperature. The tensile modulus can be raised up to approximately 5,000 $Kg/mm^2$. Furthermore, the tensile strength is preferably at least 45 $Kg/mm^2$ and more preferably at least 55 $Kg/mm^2$.

As will be apparent from the foregoing description, a solvent, handling of which is dangerous, such as concentrated sulfuric acid, need not be used for the spinning dope or at intermediate steps of the shaping process in the process of the present invention, and the corrosive action of concentrated sulfuric acid or the like need not be taken into account. Therefore, the intended high-tenacity wholly aromatic polyamide shaped article having a very high modulus can be prepared very easily according to the present invention.

The shaped articles of the present invention is valuable as industrial materials such as fibers, ropes and films, especially those for which a high modulus is required. It is surprising that a modulus tenacity as high as that of a shaped article obtained by liquid crystal spinning and heat treatment of poly(p-phenylene terephthalamide) can be manifested by virtue of the specific composition ratio of the special skeleton structure of the wholly aromatic polyamide of the present invention. It has been considered that the modulus of a random copolymer is reduced as the number of copolymerized components is increased or the copolymerization ratio of a modifying comonomer or monomers is increased. In view of this accepted concept, it would be quite surprising that such a high modulus as mentioned above can be attained according to the present invention.

Excellent properties of the fiber of the present invention are manifested through the spinning and heat treatment steps, though complete physical elucidation has not been made. In case of a homopolymer or regular copolymer, crystallization is considerably advanced in the state of an as-spun yarn, and orientation is very difficult at the subsequent stretching step. In contrast, in case of the random copolymer constituting the fiber of the present invention, the degree of crystallization before the stretching step is low and orientation at the stretching step is very easy. This will be apparent from the actual stretching operation and from the results of measurement of various physical characteristics.

The present invention will now be described in detail with reference to the following Examples. In the Examples, the intrinsic viscosity ($\eta$ inh) was determined by isolating a polymer from a polymer solution and conducting the measurement on a polymer solution in concentrated sulfuric acid at a polymer concentration of 0.5 g/100 ml at a temperature of 30° C. as described hereinbefore.

The tensile characteristics of fibers were determined on multifilaments or monofilaments by using an Instron tester.

In case of multifilaments, a specimen having a length of 5 cm was drawn at a grip separation speed of 5 cm/min, and the strength, elongation and initial modulus were obtained from a load-elongation curve. The denier of the multifilaments was determined by weighing a certain length of the sample (under a tension of 0.1 g/d).

In case of monofilaments, the physical properties were obtained from a load-elongation curve determined by the measurement using an Instron tester under the same conditions as described above with respect to multifilaments. The denier of the monofilaments was determined from an inherent resonance oscillation number determined by oscillating the filaments under tension while changing the oscillation number.

The tensile characteristics of films were determined on a specimen having a width of 1 cm and a length of 10 cm by using an Instron tester at a grip separation speed of 10 cm/min, and physical properties were obtained from the load-elongation curve.

Abbreviations of terms used in the present application are set out in the following table.

TABLE OF ABBREVIATIONS 3,4'-ODA: 3,4'-diaminodiphenyl ether
CPA: O-chloro-P-phenylene diamine
NMP: N-methyl-2-pyrorrolidone
TPC: Terephthaloyl chloride
PPD: p-phenylene diamine
HMPA: hexamethylphosphoramide
DMA: N,N-dimethylacetamide
DMSO: demethylsulfoxide
DMF: N,N-dimethylformamide
TMU: N,N,N',N'-tetramethylurea

Example 1

In a dry nitrogen atmosphere, 11.942 g of o-chloro-p-phenylene diamine (hereinafter referred to as "CPA" for brevity) and 7.186 g of 3,4'-diaminodiphenyl ether (hereinafter referred to as "3,4'-ODA" for brevity) were dissolved in 543.5 g of N-methyl-2-pyrrolidone (hereinafter referred to as "NMP" for brevity). The solution was maintained at 20° C. and 24.310 g of a powder of terephthaloyl chloride (hereinafter referred to as "TPC" for brevity) was added to the solution under violent agitation. Then, the temperature was maintained at 60° C. and agitation was continued. The viscosity was gradually increased and a transparent, highly viscous solution was obtained.

After about 1 hour, 8.74 g of calcium hydroxide were added to the solution to neutralize hydrochloric acid formed as a by-product, whereby a highly viscous, transparent solution was obtained.

A part of the solution was sampled and mixed with water, and the precipitated polymer was separated, washed with water and dried and the ηinh value was measured. It was found that the ηinh value of the polymer was 3.44.

The neutralized solution was filtered, deaerated and extruded into an aqueous coagulating bath through a spinneret having 5 orifices, each having a diameter of 0.3 mm, at a spinneret temperature of 120° C. and an extrusion speed of 5 m/min according to the semi-dry semi-wet spinning method.

Then, the spun fiber was sufficiently washed in a multi-staged water washing bath, dried and stretched at various hot plate temperatures indicated in Table 1. The physical properties of the stretched fibers as multi-filaments were measured to obtain results shown in Table 1.

TABLE 1

| Hot Plate Temperature (°C.) | Stretch Ratio | Fineness (denier) | Strength (g/d) | Elongation (%) | Young's Modulus (g/d) |
|---|---|---|---|---|---|
| 490 | 9.9 | 17.0 | 27.0 | 4.3 | 782 |
| 500 | 11.3 | 14.5 | 28.0 | 3.9 | 823 |
| 510 | 13.1 | 13.0 | 26.2 | 4.1 | 820 |

Example 2

In a dry nitrogen atmosphere, 2.226 g of p-phenylene diamine (hereinafter referred to as "PPD" for brevity), 7.338 g of CPA and 6.181 g of 3,4'-ODA were dissolved in 553.5 g of NMP, and 20.916 g of a powder of TPC were added to the solution under agitation at room temperature. The viscosity of the solution gradually increased, and a homogeneous, transparent, highly viscous solution was obtained.

After about 1 hour, 7.52 g of powdery calcium hydroxide were added to the solution to neutralize hydrochloric acid formed as a by-product, whereby a highly viscous, transparent solution was obtained. A part of the solution was sampled and mixed with water, and the precipitated polymer was separated, washed with water and dried. The ηinh value of the polymer was measured. It was found that the ηinh value was 3.58.

The neutralized solution was filtered, deaerated and spun by using a spinneret having 12 orifices, each having a diameter of 0.3 mm, in the same manner as described in Example 1, and the spun fiber was stretched at a stretch ratio of 11 on a hot plate maintained at 500° C. The obtained fiber was characterized by a total filament fineness of 29.3 denier, a strength of 28.2 g/d, an elongation of 3.9% and a Young's modulus of 830 g/d.

Example 3

In a dry nitrogen atmosphere, 3.312 g of PPD, 5.824 g of CPA and 6.133 g of 3,4'-ODA were dissolved in 542.5 g of NMP, and 20.755 g of a powder of TPC were added to the solution under agitation at room temperature. The viscosity of the solution was gradually increased and a highly viscous, transparent solution was obtained.

After about 1 hour, 7.46 g of powdery calcium hydroxide were added to the solution to effect neutralization, whereby a highly viscous, transparent solution was obtained.

A part of the solution was sampled and mixed with water, and the precipitated polymer was isolated, washed with water and dried. The ηinh value of the polymer was measured. It was found that the ηinh value was 3.04.

The neutralized solution was spun by using a spinneret having 5 orifices, each having a diameter of 0.3 mm, in the same manner as described in Example 1. The spun fiber was stretched at a stretch ratio of 14.3 on a hot plate maintained at 510° C. The obtained fiber was characterized by a total filament fineness of 9.1 denier, a strength of 22.0 g/d, an elongation of 3.0% and a Young's modulus of 860 g/d.

Example 4

In a dry nitrogen atmosphere, 5.606 g of PPD, 2.218 g of CPA and 7.266 g of 3,4'-ODA were dissolved in 543.0 g of NMP, and 21.087 g of a powder of TPC were added to the solution under agitation at room temperature to obtain a homogeneous, transparent, highly viscous solution.

After about 1 hour, 7.5 g of calcium hydroxide were added to the solution to effect neutralization, whereby a highly viscous, transparent solution was obtained. A part of the solution was sampled and mixed with water, and the precipitated polymer was isolated, washed with water and dried. The ηinh value of the polymer was measured. it was found that the 0inh value was 3.56.

The neutralized solution was spun in the same manner as described in Example 1 and stretched at a stretch ratio of 9.5 on a hot plate maintained at 510° C. The obtained fiber was characterized by a single filament fineness of 1.69 denier, a strength of 26.4 g/d, an elongation of 3.4% and a Young's modulus of 923 g/d.

Example 5

The neutralized solution obtained in Example 4 was maintained at 120° C. and was cast on a glass sheet maintained at 110° C. by means of a doctor knife. The solvent was removed from the cast solution at 160° C. in a hot air drier, and removal of the solvent was further conducted in a water bath maintained at room temperature to obtain a homogeneous and transparent film.

The film was dried while keeping the length constant and was then stretched uniaxially at a stretch ratio of 3 in an atmosphere maintained at 400° C. in an electric furnace by using a film tenter.

The physical properties of the obtained film as measured in the stretching direction thereof were a strength of 61 Kg/mm², an elongation of 8% and a Young's modulus of 1,800 Kg/mm², and the thickness of the film was 23 microns.

We claim:

1. A shaped article in the form of a fiber having a tensile modulus of from 700 to approximately 2,000g/d at room temperature or a film having a tensile modulus from 1,800 to approximately 5,000 kg/mm² at room temperature, said shaped article comprising a wholly aromatic copolyamide copolymer consisting of recurring units of the formula:

$$-[NH-Ar_1-NH-CO-Ar_2-CO]- \quad (A)$$

or a mixture of recurring units of the formula (A) and the formula:

$$-[NH-Ar_3-CO]- \quad (B)$$

wherein

Ar₁ independently represents divalent aromatic hydrocarbon ring residues selected from the group consisting of

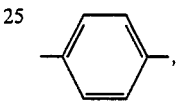

(a)

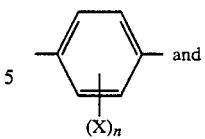

(b)

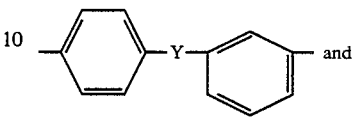

(c)

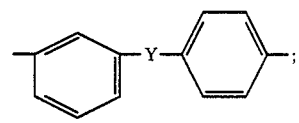

Ar₂ independently represents divalent aromatic hydrocarbon ring residues selected from the group consisting of

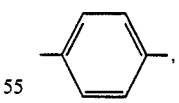

(a)

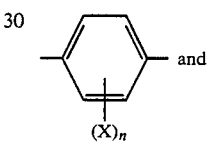

(b)

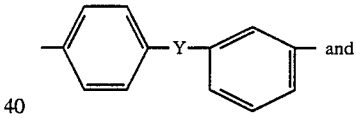

(c)

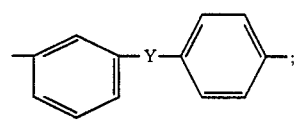

Ar₃ independently represents divalent aromatic hydrocarbon ring residues selected from the group consisting of

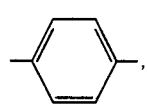

(a)

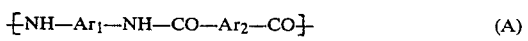

(b)

(c)

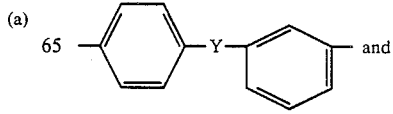

-continued

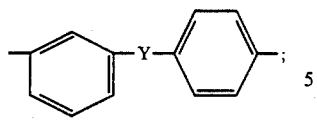

wherein X is halo, n is an integer of from 1 or 3, and Y is a divalent radical selected from the group consisting of

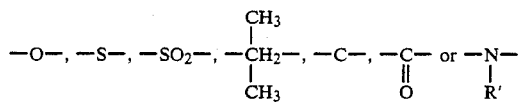

wherein R' represents an alkyl group having up to 5 carbon atoms, wherein the molar ratio of the aromatic residues of $Ar_1$, $Ar_2$ and $Ar_3$ fall within the region formed by connecting points P, Q, R and S in order, through straight lines in the triangular coordinate of FIG. 1 attached hereto, said wholly aromatic copolyamide having an intrinsic viscosity of at least 1.5 as measured on a solution containing 0.5 g of the copolyamide in 100 ml of concentrated sulfuric acid at 30° C.

2. A shaped article as claimed in claim 1, wherein said fiber has a tensile modulus of at least 750 g/d at room temperature.

3. A shaped article as claimed in claim 1 wherein said fiber has a tensile strength of at least 18 g/d at room temperature.

4. A shaped article of claim 1 wherein the recurring units are units of the formula (A).

5. A shaped article of claim 2 wherein the recurring units are units of the formula (A).

6. A shaped article of claim 3 wherein the recurring units are units of the formula (A).

* * * * *